(12) United States Patent
Hikichi et al.

(10) Patent No.: US 6,670,408 B2
(45) Date of Patent: Dec. 30, 2003

(54) FRICTION MATERIAL

(75) Inventors: Akihiro Hikichi, Tokyo (JP); Mikiya Haruta, Tokyo (JP); Kazuya Horiguchi, Tokyo (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 54 days.

(21) Appl. No.: 09/735,625

(22) Filed: Dec. 14, 2000

(65) Prior Publication Data

US 2002/0012783 A1 Jan. 31, 2002

(30) Foreign Application Priority Data

Dec. 20, 1999 (JP) .......................................... P.11-361165

(51) Int. Cl.⁷ .................................................. C08J 5/14
(52) U.S. Cl. ................... 523/149; 523/152; 260/998.13
(58) Field of Search ................................. 523/149, 150, 523/152, 156, 157, 158; 508/108, 109; 524/413, 407, 495, 449, 441, 425, 430

(56) References Cited

U.S. PATENT DOCUMENTS

| | | | | |
|---|---|---|---|---|
| 4,324,706 A | * | 4/1982 | Tabe et al. .................. 523/149 |
| 4,563,495 A | * | 1/1986 | Kawaguchi et al. ........ 524/413 |
| 5,383,963 A | * | 1/1995 | Kobayashi et al. ........... 106/36 |
| 5,891,933 A | * | 4/1999 | Kesavan et al. ............. 523/158 |
| 5,942,205 A | * | 8/1999 | Murata et al. ............... 423/598 |
| 5,952,416 A | * | 9/1999 | Tani et al. ................... 524/413 |
| 6,013,238 A | * | 1/2000 | Murata et al. ............... 423/598 |
| 6,036,938 A | * | 3/2000 | Konnai et al. .............. 423/592 |
| 6,251,361 B1 | * | 6/2001 | Konnai et al. .............. 423/598 |
| 6,355,601 B1 | * | 3/2002 | Takenaka et al. ........... 508/108 |

FOREIGN PATENT DOCUMENTS

| | | |
|---|---|---|
| JP | 5-139808 | 6/1993 |
| JP | 2767504 | 4/1998 |
| JP | 2816906 | 8/1998 |
| JP | 2879364 | 1/1999 |
| WO | WO 00/49104 A1 * | 8/2000 ............ C09K/3/14 |

* cited by examiner

Primary Examiner—Edward J. Cain
Assistant Examiner—Katarzyna Lee
(74) Attorney, Agent, or Firm—Finnegan, Henderson, Farabow, Garrett & Dunner LLP

(57) ABSTRACT

A friction material comprises a fibrous reinforcement, a friction modifier and a binder. At least potassium hexatitanate fiber and potassium octatitanate fiber are used together as the fibrous reinforcement and mixed at a ratio in a range between 2 wt % and 40 wt % of the whole of the friction material as total amount. It is preferable that a mixing ratio of the potassium hexatitanate fiber to the potassium octatitanate fiber is in a range between 1:4 and 4:1 by weight percentage.

8 Claims, No Drawings

FRICTION MATERIAL

BACKGROUND OF THE INVENTION

1. Field of the Invention

The present invention relates to a friction material, particularly relates to a friction material for an industrial machine, a railway vehicle, a baggage car, a passenger car, or the like, and more particularly relates to a friction material in a brake pad, a brake lining, a clutch facing, or the like, for the above-mentioned applications.

2. Description of the Related Art

In a friction material to be used mainly in a brake pad or the like, a fibrous reinforcement is used as one of materials for enhancing the strength of the friction material. Fibrous reinforcements used in place of asbestos fiber include glass fiber, steel fiber, Aramid fiber, potassium titanate fiber, etc. Since these fibrous reinforcements have their own properties respectively, a mixture of several kinds of them is used.

Of these fibrous reinforcements, potassium titanate fiber is rated highly, as abrasive hard inorganic fiber, in the point that not only can it improve the strength, the heat resistance and the wear resistance of the friction material as a whole, but also it can enhance the friction coefficient of the friction material through its abrasive property, and particularly it can ensure a high friction coefficient at the time of a high load such as high-speed braking or the like.

For example, as such background-art friction materials using potassium titanate fiber as a fibrous reinforcement, there are: a friction material in which one or more kinds of potassium titanate fibers with purity of 98% or higher are mixed (JP-B2-2767504, hereinafter referred to as "Background Art 1"); a friction material in which potassium titanate fiber having a sectional diameter in a range between 5 $\mu$m and 10 $\mu$m and having an aspect ratio in a range between 3 and 7 is mixed (JP-B2-2816906, equivalent to JP-A-5-139808, hereinafter referred to as "Background Art 2"); and a friction material in which two kinds of potassium titanate fibers different in fiber length and fiber diameter are mixed (JP-B2-2879364, hereinafter referred to as "Background Art 3").

An object of the Background Art 1 is to make the purity of potassium titanate fiber high enough to give the fiber a high melting point and a high thermal conductivity so as to obtain an effect of conspicuously enhancing the friction coefficient and the wear resistance in a high temperature range. An object of the Background Art 2 is to use potassium titanate fiber having a specific fiber diameter and a specific aspect ratio so as to obtain a friction material having stable wear resistance, that is, so as to obtain a friction material having excellent wear resistance from a low temperature range to a high temperature range and a stable friction coefficient against a temperature change.

On the other hand, an object of the Background Art 3 is to obtain a friction material in which the friction noise performance and the high-temperature wear resistance are superior and the friction performance is also excellent. The Background Art 3 discloses that, by using two kinds of potassium titanate fibers, the face-to-face aggressiveness is reduced, the friction performance is stabilized from low temperature to high temperature, and the friction noise performance is enhanced.

In the Background Art 3, however, potassium titanate fibers which are very different in fiber length and fiber diameter are required to be used. That is, one kind of fiber has a fiber length of 0.1 to 3 mm and a fiber diameter of 10 to 60 $\mu$m while the other kind of fiber has a fiber length of 10 to 30 $\mu$m and a fiber diameter of 0.2 to 0.5 $\mu$m. Accordingly, there is a problem that it is difficult to uniformly mix and disperse fine needle-like fiber and comparatively bulky flake-like polycrystal fiber, and hence the manufacturing cost of the friction material is increased.

As described above, in the background-art friction material having potassium titanate fiber mixed, there is a problem that the friction noise property and the abnormal noise property are not taken into consideration at all, or even if attention is paid to the improvement of these properties, the manufacturing cost is expensive.

SUMMARY OF THE INVENTION

It is therefore an object of the present invention to provide a friction material in which the friction noise property and the abnormal noise property can be improved only by using potassium titanate fibers which have hitherto existed on the market and which are different only in chemical composition, without necessity of using fibers which are so different in fiber diameter and fiber length that they are difficult to be mixed or dispersed uniformly.

In order to solve the foregoing problem, the present inventors carried out various researches about materials and forms of inorganic fibers using no potassium titanate fibers which were manufactured in different techniques so as to have different fiber diameters and lengths and which were high in manufacturing cost, but nevertheless giving a friction material a friction noise property, a wear resistance and an friction performance which were equal to those in the case of using the above-mentioned inorganic fibers.

Thus, taking it into consideration that, when potassium titanate fibers different in composition were used together, a friction material could be obtained to have a friction noise property, a wear resistance property and an friction performance which are similar to those in the case of using potassium titanate fibers which are different in fiber diameter and fiber length.

That is, the present invention solved the foregoing problem by the following friction materials.

(1) A friction material comprising a fibrous reinforcement, a friction modifier and a binder, wherein at least potassium hexatitanate fiber and potassium octatitanate fiber are used together as the fibrous reinforcement and mixed at a ratio in a range of from 2 wt % to 40 wt % of the whole of the friction material as total amount.

(2) A friction material according to (1), wherein a mixing ratio of the potassium hexatitanate fiber to the potassium octatitanate fiber is in a range between 1:4 and 4:1 by weight percentage.

DETAILED DESCRIPTION OF THE PREFERRED EMBODIMENTS

A friction material is composed of a fibrous reinforcement, a friction modifier, a binder, etc. According to the present invention, as a fibrous reinforcement, asbestos is not used but two kinds of potassium titanate fibers different in composition are used.

The potassium titanate fibers to be used in the present invention may be manufactured without requiring any industrial purified titanium oxide having high purity as titanium oxide for starting material, but may be manufactured with titanium oxide having general industrial purity in the condition and process of a firing method, a KDC method, a fluxing method, a melting method, or the like. The chemical compositions of the potassium titanate fibers include potassium octatitanate ($K_2O.8TiO_2$), potassium hexatitanate ($K_2O.6TiO_2$), potassium tetratitanate ($K_2O.4TiO_2$), and so on. Particularly, it is preferable to use the former two with together.

The sizes of the potassium titanate fibers are not limited specifically. Polycrystal fibers of various sizes (the fiber sizes can be adjusted in a comparatively wide range through a treatment process and conditions after heating and melting) manufactured by the aforementioned melting method may be used together suitably. For example, comparatively large-size fibers having a sectional diameter of about 20 to 50 $\mu$m and a length of about 100 to 300 $\mu$m, or comparatively small-size fibers having a sectional diameter of about 5 to 10 $\mu$m and a length of about 15 to 100 $\mu$m may be used together.

The total amount of the above-mentioned two kinds of fibers in the friction material is set to be in a range between 2 wt % and 40 wt % of the whole of the friction material. If the total amount is smaller than 2 wt %, it is difficult to disperse the fibers uniformly when they are mixed and stirred. Accordingly, a desired friction noise preventing effect cannot be obtained. On the contrary, if the total loading is larger than 40 wt %, though the friction noise preventing effect is enhanced, the porosity becomes so large that the wear resistance property deteriorates. Therefore, the total loading is set to be not larger than 40 wt %. Preferably the total loading is set to be in a range between 10 wt % and 30 wt %.

Then, especially in view of the friction noise property and the abnormal noise property of the friction material, it is preferable that the potassium octatitanate fiber and the potassium hexatitanate fiber are mixed at a ratio in a range between 1:4 and 4:1.

In addition, the fibrous reinforcements including these fibers may be subjected to surface treatment with a silane coupling agent or phenolic resin. The fibrous reinforcements subjected to such surface treatment has an advantage that they can be easily mixed with other materials uniformly when a friction material is manufactured, so that the strength of a heat-molded product is increased. The amount of the silane coupling agent or phenolic resin is preferably set to be in a range between 0.3 wt % and 5 wt % with respect to the fibrous reinforcements.

As a kind of friction modifier, metal oxide such as alumina, magnesia, or the like, is usually added to a friction material, conventionally. In the present invention, such a friction modifier may be used together with the above-mentioned fibers. Not to say, because the above-mentioned fibers also have an effect as friction modifier, an aimed effect can be obtained even if only the fibers are used.

To produce a friction material according to the present invention, the above-mentioned fibers as raw materials are mixed with a friction material composed of a fibrous reinforcement, a friction modifier, a lubricant and a binder, and the mixture is preformed and then heat-molded in an ordinary producing process.

Examples of the fibrous reinforcements in the friction material according to the present invention, other than the potassium titanate fibers which also function as abrasive, may include organic fiber such as aromatic polyamide fiber, fire-resistant acrylic fiber, or the like; and metal fiber such as copper fiber, steel fiber, or the like.

Examples of the inorganic fillers may include metal particles of copper, aluminum, zinc, or the like; flake minerals such as vermiculite, mica, or the like; barium sulfate or calcium carbonate; or the like.

Examples of the binders may include thermosetting resin such as phenolic resin (including straight phenolic resin, and various phenolic resin modified with rubber or the like), melamine resin, epoxy resin, polyimide resin, etc.

Examples of the friction modifiers may include inorganic friction modifiers such as alumina, silica, magnesia, zirconia, chrome oxide, quartz, etc.; and organic friction modifiers such as synthetic rubber, cashew dust, etc. Examples of solid lubricants may include graphite, molybdenum disulfide, etc.

The friction material may take a variety of compounding ratios as its composition.

That is, one or more kinds of these raw materials may be selected and mixed in accordance with the friction properties required for products, for example, the friction coefficient, the wear resistance, the vibration property, the friction noise, etc.

A process for manufacturing a brake pad is carried out as follows. A pressure plate is molded into a predetermined form by sheet metal pressing, subjected to degreasing and primer processing, and coated with an adhesive agent. Fibrous reinforcements of heat-resistant organic fiber, metal fiber, or the like, are mixed with powdered raw materials of organic and inorganic fillers, a friction modifier, a thermosetting resin binder, and so on, and then sufficiently homogenized by stirring. The sufficiently homogenized raw materials are molded (preformed) at room temperature and under predetermined pressure so that a preformed friction material is produced. The pressure plate and the preformed friction material are heat-molded at predetermined temperature and under predetermined pressure in a heat-molding process so as to be fixed integrally with each other. The integrated friction material is after-cured and finally subjected to finishing. This manufacturing process is the same as that in the conventional method.

The present invention will be described specifically on the basis of the following examples. However, the present invention is not limited to only these examples.

EXAMPLES

Materials of Friction Material Samples

The following materials were used as the materials of the friction material so as to produce samples of friction materials. In producing the samples, materials were selected from the following materials and their mixture was changed in every sample.

| | |
|---|---|
| Binder | phenolic resin |
| Organic friction modifier | cashew dust |
| Filler | barium sulfate (powder, average particle size 8 μm) |
| Abrasive | zirconia (powder, average particle size 11 μm) |
| Solid lubricant | graphite (powder, average particle size 60 μm) |

-continued

| | |
|---|---|
| Fibrous reinforcement | copper fiber (fiber diameter 90 μm)/Aramid fiber (fiber diameter 13.5 μm) |
| Abrasive | potassium octatitanate fiber (fiber diameter 0.5 μm) potassium hexatitanate fiber (fiber diameter 0.7 μm) |

Compositions of the Friction Material Samples

Compositions having mixture ratios shown in Table 1 were used respectively for producing samples of friction materials. Thus, Samples of Examples 1 to 6 were prepared.

For the sake of comparison, samples using only potassium octatitanate fiber were prepared (Comparative Example 1).

Producing Brake Pad Samples

Brake pads having the samples of friction materials with the above-mentioned compositions were produced by a conventional producing method.

TABLE 1

| | Comparative | Example | | | | | |
|---|---|---|---|---|---|---|---|
| Component (wt %) | Example 1 | 1 | 2 | 3 | 4 | 5 | 6 |
| Phenolic Resin | 10 | 10 | 10 | 10 | 10 | 10 | 10 |
| Cashew Dust | 10 | 10 | 10 | 10 | 10 | 10 | 10 |
| Barium Sulfate | 25 | 25 | 15 | 45 | 25 | 35 | 35 |
| Zirconia | 2 | 2 | 2 | 2 | 2 | 2 | 2 |
| Graphite | 8 | 8 | 8 | 8 | 8 | 8 | 8 |
| Copper Fiber | 10 | 10 | 10 | 10 | 10 | 10 | 10 |
| Aramid Fiber | 5 | 5 | 5 | 5 | 5 | 5 | 5 |
| Potassium Hexatitanate Fiber | 0 | 15 | 20 | 5 | 10 | 4 | 16 |
| Potassium Octatitanate Fiber | 30 | 15 | 20 | 5 | 20 | 16 | 4 |

Examination Method

In a vehicle to which a disc brake using a new rotor was attached, braking at a vehicle speed of 20 km/h, and at a deceleration α=1.96 m/s$^2$ was performed 20 times while water was poured by hose on the rotor and a brake pad at the rate of 10 liters per minute. In such a manner, if the brake pad produced friction noise, it was judged to be poor, and if it produced no friction noise, it was judged to be excellent. On the other hand, the abnormal noise property was evaluated by sound pressure dB when the vehicle started after stopping at 30° C. in the above conditions.

Examination Results

The results of the examinations are shown in Table 2.

TABLE 2

| Examination Item | Comparative Example 1 | Example | | | | | |
|---|---|---|---|---|---|---|---|
| | | Example 1 | Example 2 | Example 3 | Example 4 | Example 5 | Example 6 |
| Friction Noise test | Poor | Excellent | Excellent | Excellent | Excellent | Excellent | Excellent |
| Actual Creep Groan (dB) | 75 | 68 | 69 | 71 | 69 | 70 | 69 |

According to the present invention, not by using two kinds of potassium titanate fibers which are largely different in fiber diameter and fiber length so that they are difficult to be mixed or dispersed uniformly, but by using two kinds of potassium titanate fibers which are different only in chemical composition, it is possible to obtain a non-asbestos friction material in which the potassium titanate fibers are easy to be mixed and dispersed uniformly. Moreover, a friction material according to the present invention does not increase the cost and is superior in friction noise property and abnormal noise property.

What is claimed is:

1. A friction material for brakes or a clutch comprising:
    a fibrous reinforcement including at least two kinds of fibers different in composition, the two kinds of fibers being potassium titanate fibers of potassium hexatitanate ($K_2O.6TiO_2$) and fiber potassium octatitanate fiber ($K_2O.8TiO_2$)
    a friction modifier; and
    a binder,
    wherein the total amount of said fibrous reinforcement is mixed at a ratio in a range between 2 wt % and 40 wt % of the whole of said friction material, and
    further wherein mixing ratio of the potassium hexatitanate fiber to the potassium octatitanate fiber is in a range between 1:4 and 4:1 by weight percentage.

2. The friction material according to claim 1, wherein said fibrous reinforcement is subjected to surface treatment with one of a silane coupling agent and phenolic resin.

3. The friction material according to claim 2, wherein the amount of one of the silane coupling agent and phenolic resin is in a range between 0.3 wt % and 5 wt % with respect to said fibrous reinforcement.

4. The friction material according to claim 1, wherein the fibers of said fibrous reinforcement are selected from the group consisting of potassium octatitanate ($K_2O.8TiO_2$) fiber, potassium hexatitanate ($K_2O.6TiO_2$) fiber, potassium tetratitanate ($K_2O.4TiO_2$) fiber, aromatic polyamide fiber, fire-resistant acrylic fiber, copper fiber, and steel fiber.

5. The friction material according to claim 1, wherein said friction modifier includes at least one of alumina, silica, magnesia, zirconia, chrome oxide, quartz, synthetic rubber, and cashew dust.

6. The friction material according to claim 1, wherein said binder includes at least one of phenolic resin, melamine resin, epoxy resin, and polyimide resin.

7. The friction material according to claim 1, further comprising an inorganic filler including at least one of copper, aluminum, zinc, vermiculite, mica, barium sulfate, and calcium carbonate.

8. The friction material according to claim 1, further comprising a solid lubricant including at least one of graphite and molybdenum disulfide.

* * * * *

UNITED STATES PATENT AND TRADEMARK OFFICE
CERTIFICATE OF CORRECTION

PATENT NO. : 6,670,408 B2
DATED : December 30, 2003
INVENTOR(S) : Akihiro Hikichi et al.

It is certified that error appears in the above-identified patent and that said Letters Patent is hereby corrected as shown below:

Column 6,
Lines 42 and 62, "($K_2O.6TiO_2$)" should read -- ($K_2O \cdot 6TiO_2$) --.
Lines 43 and 61, "($K_2O.8TiO_2$)" should read -- ($K_2O \cdot 8TiO_2$) --.
Line 63, "($K_2O.4TiO_2$)" should read -- ($K_2O \cdot 4TiO_2$) --.

Signed and Sealed this

Ninth Day of March, 2004

JON W. DUDAS
*Acting Director of the United States Patent and Trademark Office*